US012761639B2

(12) United States Patent
Akatsuka et al.

(10) Patent No.: US 12,761,639 B2
(45) Date of Patent: Oct. 13, 2026

(54) CONVEYANCE APPARATUS INFORMATION TEACHING SYSTEM AND CONVEYANCE APPARATUS INFORMATION TEACHING METHOD

(71) Applicant: FUJI CORPORATION, Chiryu (JP)

(72) Inventors: Shohei Akatsuka, Chiryu (JP); Daisuke Yamanaka, Kariya (JP); Keisuke Hoshi, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 325 days.

(21) Appl. No.: 18/293,685

(22) PCT Filed: Aug. 25, 2021

(86) PCT No.: PCT/JP2021/031114

§ 371 (c)(1),
(2) Date: Jan. 30, 2024

(87) PCT Pub. No.: WO2023/026387

PCT Pub. Date: Mar. 2, 2023

(65) Prior Publication Data

US 2024/0345571 A1 Oct. 17, 2024

(51) Int. Cl.
*G05B 19/418* (2006.01)

(52) U.S. Cl.
CPC .................... *G05B 19/4189* (2013.01); *G05B 2219/23258* (2013.01); *G05B 2219/2621* (2013.01)

(58) Field of Classification Search
CPC ...... G05B 19/4189; G05B 2219/23258; G05B 2219/2621; G06Q 50/04; G06T 19/006; Y02P 90/02
See application file for complete search history.

(56) References Cited

U.S. PATENT DOCUMENTS

2014/0240484 A1* 8/2014 Kodama .............. G02B 27/017 348/86
2019/0187477 A1* 6/2019 Fujimaki .............. G05B 19/042
(Continued)

FOREIGN PATENT DOCUMENTS

JP 2008-299714 A 12/2008
JP 2014-235704 A 12/2014
(Continued)

OTHER PUBLICATIONS

International Search Report issued Oct. 26, 2021 in PCT/JP2021/031114, filed on Aug. 25, 2021, 2 pages.

*Primary Examiner* — Zhipeng Wang
(74) *Attorney, Agent, or Firm* — Oblon, McClelland, Maier & Neustadt, L.L.P.

(57) ABSTRACT

A conveyance apparatus information teaching system includes an acquisition section and a display section. The acquisition section acquires conveyance apparatus information including information related to the movement of a conveyance apparatus configured to convey an article used in a predetermined board work to a board production line including a board working machine configured to produce a board product by performing the board work on a board. When an operator visually recognizes a target region which is at least a part region of the board production line via an augmented reality device capable of displaying virtual information in accordance with a real world visually recognized by the operator, the display section displays the virtual information including the conveyance apparatus information acquired by the acquisition section in an overlapping manner on a real target region visually recognized by the operator via the augmented reality device.

12 Claims, 4 Drawing Sheets

(56) References Cited

U.S. PATENT DOCUMENTS

| | | | | |
|---|---|---|---|---|
| 2019/0287304 | A1* | 9/2019 | Davies | G06T 7/73 |
| 2021/0237275 | A1* | 8/2021 | Stone | B25J 9/1689 |

FOREIGN PATENT DOCUMENTS

| | | | |
|---|---|---|---|
| JP | 2019-109850 | A | 7/2019 |
| JP | 2020-35280 | A | 3/2020 |
| WO | WO 2016/151724 | A1 | 9/2016 |

* cited by examiner

CONVEYANCE APPARATUS INFORMATION TEACHING SYSTEM AND CONVEYANCE APPARATUS INFORMATION TEACHING METHOD

TECHNICAL FIELD

The present description relates to a conveyance apparatus information teaching system and a conveyance apparatus information teaching method.

BACKGROUND ART

The board production support system described in Patent Literature 1 recognizes at least a part of a board on which an electronic component is mounted, a board production device for producing the board, and a functional unit exchangeably mounted on the board production device as a recognition target, and provides production information of the recognition target to an operator who performs production management of the board. The board production support system includes a production information management device and an augmented reality terminal device. The production information management device manages production information of each recognition target.

The augmented reality terminal device includes an imaging section, a marker recognition section, and an augmented reality display section. The imaging section acquires a visual-field image by imaging a recognition target included in a visual field of an operator. The marker recognition section recognizes a unique identification marker provided in the recognition target, which is an identification marker in the visual-field image. The augmented reality display section displays production information of the recognition target specified by the identification marker in the visual-field image, in an overlapping manner on the visual-field image or in the visual field of the operator.

The transmissive display device disclosed in Patent Literature 2 includes an image display section, an interference risk region calculation section, a risk level specifying section, and a display control section. The image display section displays an image so as to be visually recognizable together with the outside scene through the outside scene. The interference risk region calculation section calculates an interference risk region that is a region in which there is a risk of interference between a user of the transmissive display device and a moving body. The risk level specifying section specifies a risk level of interference based on a relative positional relationship between the user and the moving body. The display control section causes the image display section to display an image indicating the interference risk region in a display mode corresponding to the specified risk level.

PATENT LITERATURE

Patent Literature 1: JP-A-2014-235704
Patent Literature 2: JP-A-2019-109850

BRIEF SUMMARY

Technical Problem

A board production line may be provided with a conveyance apparatus that conveys an article used in a board work. The conveyance apparatus moves in the board production line and stops when the operator approaches the conveyance apparatus. As the number of times of stops of the conveyance apparatus increases, the production efficiency of board products in the board production line may decrease. Therefore, there is a demand for providing information related to the movement of the conveyance apparatus to the operator to reduce the stops of the conveyance apparatus due to the approach of the operator.

In view of such circumstances, the present description discloses a conveyance apparatus information teaching system and a conveyance apparatus information teaching method that can guide an operator with information related to the movement of the conveyance apparatus.

Solution to Problem

The present description discloses a conveyance apparatus information teaching system including an acquisition section and a display section. The acquisition section acquires conveyance apparatus information including information related to the movement of a conveyance apparatus configured to convey an article used in a predetermined board work to a board production line including a board working machine configured to produce a board product by performing the board work on a board. When an operator visually recognizes a target region which is at least a part region of the board production line via an augmented reality device capable of displaying virtual information in accordance with a real world visually recognized by the operator, the display section displays the virtual information including the conveyance apparatus information acquired by the acquisition section in an overlapping manner on a real target region visually recognized by the operator via the augmented reality device.

In addition, the present description discloses a conveyance apparatus information teaching method including an acquisition step and a display step. The acquisition step acquires conveyance apparatus information including information related to the movement of a conveyance apparatus configured to convey an article used in a predetermined board work to a board production line including a board working machine configured to produce a board product by performing the board work on a board. The display step displays the virtual information including the conveyance apparatus information acquired by the acquisition section in an overlapping manner on a real target region visually recognized by the operator via the augmented reality device when an operator visually recognizes a target region which is at least a part region of the board production line via an augmented reality device capable of displaying virtual information in accordance with a real world visually recognized by the operator.

ADVANTAGEOUS EFFECTS

The above-described conveyance apparatus information teaching system includes an acquisition section and a display section. Accordingly, the conveyance apparatus information teaching system can guide an operator with information (conveyance apparatus information) related to the movement of the conveyance apparatus. The above description of the conveyance apparatus information teaching system can be similarly applied to a conveyance apparatus information teaching method.

DESCRIPTION OF EMBODIMENTS

1. Embodiments

1-1. Configuration Example of Board Production Line WL0

Figure 1:
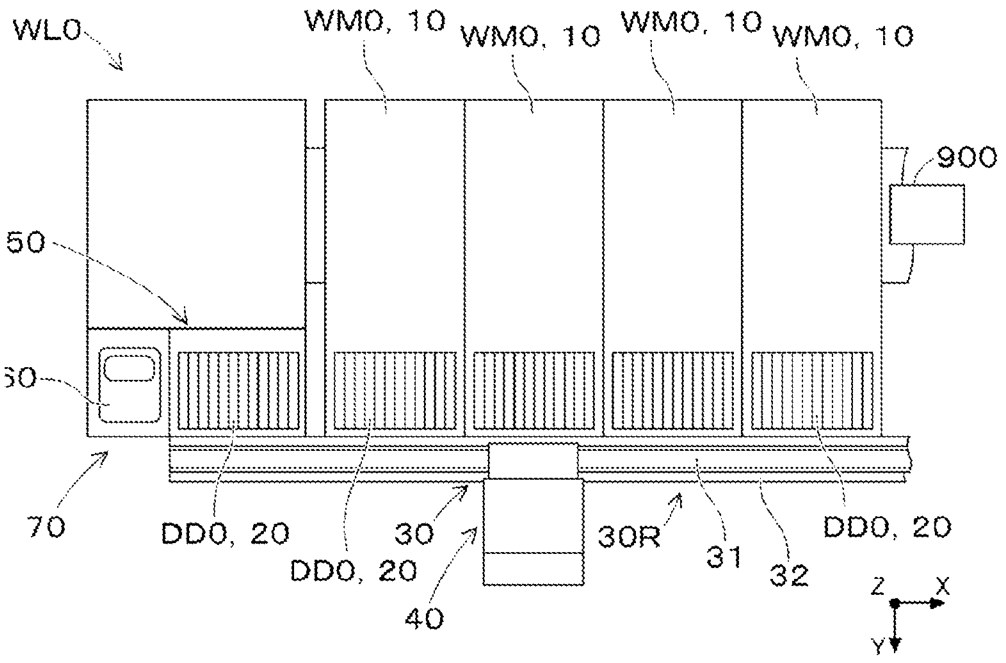
FIG. 1 is a plan view illustrating a configuration example of a board production line.

Conveyance apparatus information teaching system 70 of the present embodiment is applied to board production line WL0. As illustrated in FIG. 1, board production line WL0 includes at least one component mounter 10, exchange system 30, conveyance apparatus 40, storage device 50, and line management device 60. Although four component mounters 10 are illustrated in FIG. 1 for convenience of illustration, four or multiple component mounters 10 are actually provided.

Figure 2:
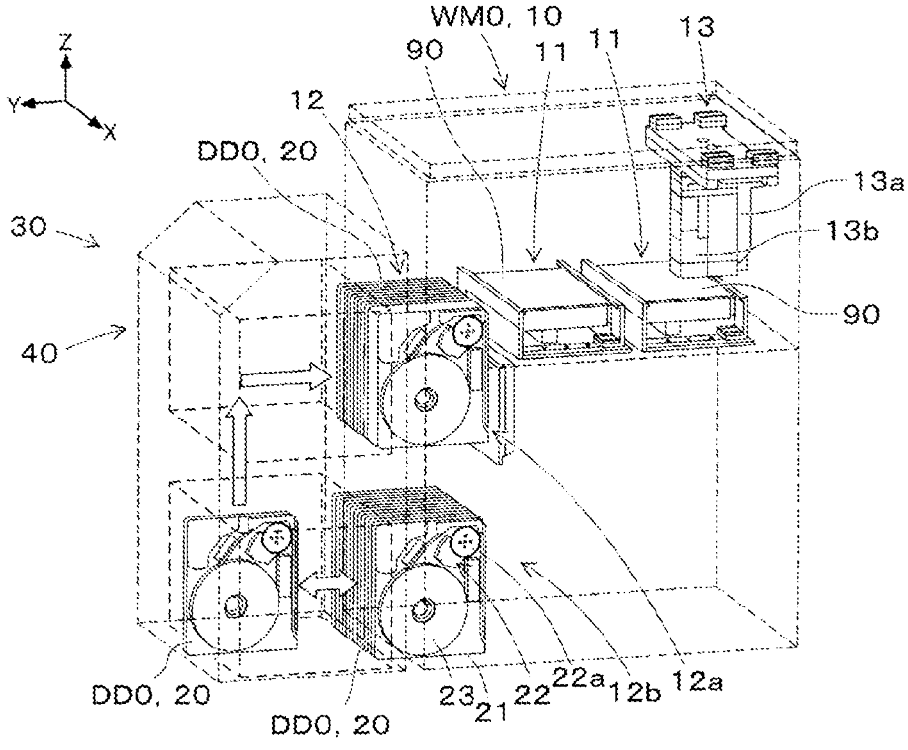
FIG. 2 is a perspective view illustrating a configuration example of an exchange system and a component mounter illustrated in FIG. 1.

Multiple component mounters 10 are installed along a conveyance direction (X direction) of board 90 illustrated in FIG. 2. Component mounter 10 is included in board working machine WM0 that produces board product 900 by performing a predetermined board work on board 90. The board work by component mounter 10 includes a carrying-in work and a carrying-out work of board 90, a supply work, a pick-up work, a mounting work, and the like of a component. Component mounter 10 is detachably provided with, for example, cassette-type feeder 20.

Storage device 50 used for storing feeder 20 is installed, for example, on the board loading side of board production line WL0 (on the left of the drawing in FIG. 1). In addition, exchange system 30 and conveyance apparatus 40 are provided on board production line WL0, and perform the supply work, exchange operation, and collecting work of feeder 20. The configuration of board production line WL0 may be appropriately changed according to, for example, the type of board product 900 to be produced.

Specifically, board working machine WM0 such as a solder printer, a solder inspection machine, a reflow furnace, and an appearance inspector can be appropriately installed in board production line WL0. As described above, board production line WL0 can subsequently convey board 90 by using various board working machines WM0, execute production processing including inspection processing, and produce board product 900.

Board working machine WM0 constituting board production line WL0 is capable of inputting and outputting various data to and from line management device 60 via a network. For example, storage device 50 includes multiple slots. Storage device 50 stocks feeder 20 installed in the multiple slots. Feeder 20 installed in the slot of storage device 50 is in a state capable of communicating with line management device 60. As a result, the slot of storage device 50 and the identification information of feeder 20 installed in the slot are associated with each other and recorded in line management device 60.

In addition, line management device 60 monitors an operation situation of board production line WL0, and integrally controls board working machine WM0 such as component mounter 10, exchange system 30, conveyance apparatus 40, and storage device 50. Line management device 60 stores various data for controlling board working machine WM0, exchange system 30, conveyance apparatus 40, and storage device 50. Line management device 60 transmits various data such as a production program when, for example, component mounter 10 executes the component mounting process.

1-2. Configuration Example of Component Mounter 10

As illustrated in FIG. 2, each of multiple component mounters 10 includes board conveyance device 11, component supply device 12, and head driving device 13. In the present description, the conveyance direction of board 90 is defined as an X direction. In addition, a direction orthogonal to the X direction in the horizontal plane is defined as a Y direction. In addition, a vertical direction (up-down direction in the drawing in FIG. 2) orthogonal to the X direction and the Y direction is defined as a Z direction.

Board conveyance device 11 is configured with, for example, a belt conveyor and a positioning device. Board conveyance device 11 subsequently conveys board 90 in the conveyance direction (X direction), and positions board 90 at a predetermined position in the machine. Board conveyance device 11 carries board 90 out of component mounter 10 after a mounting process by component mounter 10 is ended.

Component supply device 12 supplies a component to be mounted on board 90. Component supply device 12 includes first slot 12*a* and second slot 12*b* that can be installed with multiple feeders 20. In the present embodiment, first slot 12*a* is disposed in an upper portion of a front portion side of component mounter 10 to operably hold installed feeder 20. An operation of feeder 20 installed in first slot 12*a* is controlled in the mounting process by component mounter 10, and a component is supplied at a takeout section provided at a predetermined position at the upper portion of feeder 20. As described above, first slot 12*a* can hold feeder 20 used in the production of board product 900.

In the present embodiment, second slot 12*b* is disposed below first slot 12*a* to stock installed feeder 20. Specifically, second slot 12*b* preliminarily holds feeder 20 that is scheduled to be used in the production of board product 900. In addition, second slot 12*b* temporarily holds feeder 20 that has become unnecessary in the production of board product 900. The exchange operation of feeder 20 between first slot 12*a* and second slot 12*b* is performed by conveyance apparatus 40.

As illustrated in FIG. 2, feeder 20 includes feeder main body 21 and driving device 22. Feeder main body 21 of the present embodiment is formed in a flat box shape. Feeder main body 21 detachably (exchangeably) holds reel 23 on which a carrier tape accommodating multiple components is wound. Driving device 22 includes sprocket 22*a* that engages with a feeding hole provided in the carrier tape. Driving device 22 rotates sprocket 22*a* to feed and move the carrier tape.

The operation of driving device 22 of feeder 20 is controlled by the control device of component mounter 10. When installed in first slot 12*a* of component mounter 10, feeder 20 receives power from component mounter 10 via a connector, and is in a communicable state with component mounter 10. As a result, component mounter 10 can detect the supply or collecting of feeder 20 in first slot 12*a*. The same applies to second slot 12*b* as described above for first slot 12*a*.

The feeding operation of the carrier tape, accommodating the component, of feeder 20 installed in first slot 12*a* is controlled based on a control instruction or the like by component mounter 10. As a result, feeder 20 supplies components so as to be collected by the holding member of mounting head 13*b* at the takeout section provided at the upper portion of feeder 20.

Head driving device 13 moves moving body 13*a* in the horizontal direction (X direction and Y direction) by a linear motion mechanism. Mounting head 13*b* is fixed to moving body 13*a* by a clamp member so as to be exchangeable (detachable). Mounting head 13*b* is integrally moved in the X direction and the Y direction with moving body 13*a* by the linear motion mechanism of head driving device 13. Mounting head 13*b* uses the holding member to pick up the component supplied by component supply device 12. As the holding member, for example, a suction nozzle that picks up the component by supplied negative pressure air, a chuck that grips the component, or the like can be used.

Mounting head 13*b* holds the holding member so as to be movable in the Z direction and to be rotatable about Q-axis parallel to Z-axis. Mounting head 13*b* adjusts the position and the angle of the holding member in accordance with the posture of the picked-up component. Mounting head 13*b* mounts the component on the mounting position of board 90 instructed by the production program. A total time zone of a time required for a predetermined number of cycles of a pick-and-place cycle of the above components and a time required for the carrying-in and carrying-out of board 90 corresponds to a cycle time per board 90.

The holding member provided on mounting head 13*b* may be appropriately changed according to the type of the component in the mounting process of mounting the component on board 90. Component mounter 10 attaches the suction nozzle accommodated in the nozzle station to mounting head 13*b*, for example, in a case where the suction nozzle used in the mounting process to be executed is not attached to mounting head 13*b*. The nozzle station is installed in a predetermined position in component mounter 10 in an attachable and detachable manner.

1-3. Configuration Example of Exchange System 30 and Conveyance Apparatus 40

As illustrated in FIG. 1 and FIG. 2, exchange system 30 includes first rail 31 and second rail 32. First rail 31 and second rail 32 form track 30R on which conveyance apparatus 40 moves. First rail 31 extends along the conveyance direction (X direction) of board 90, and is provided between first slot 12*a* and second slot 12*b* in the vertical direction (Z direction).

Second rail 32 extends along the conveyance direction (X direction) of board 90, and is provided below second slot 12*b* in the vertical direction (Z direction). First rail 31 and second rail 32 extend over substantially the entire region of the conveyance direction (X direction) of board 90 in board production line WL0. The conveyance direction (X direction) of board 90 corresponds to the arrangement direction of multiple component mounters 10.

Conveyance apparatus 40 is provided so as to movable (travelable) on track 30R formed by first rail 31 and second rail 32. Conveyance apparatus 40 receives power from a power transmitting section by non-contact power supply, for example, via a power receiving section provided to face the power transmitting section provided on first rail 31. The power received by the power receiving section is used for traveling of conveyance apparatus 40, a predetermined operation, or the like via the power receiving circuit. Conveyance apparatus 40 detects, for example, a position (current position) on track 30R by a position detection device. The position detection device can detect the position by, for example, an optical detection method, a detection method using electromagnetic induction, or the like.

The predetermined operation includes an exchange operation in which article DD0 used in the board work by board working machine WM0 such as component mounter 10 is exchanged with board working machine WM0. Conveyance apparatus 40 of the present embodiment uses feeder 20 for supplying components to be mounted on board 90 as article DD0, and performs the exchange operation of feeder 20 with component mounter 10 that is board working machine WM0. In addition, conveyance apparatus 40 can perform the exchange operation of feeder 20 with storage device 50 using feeder 20 as article DD0.

Conveyance apparatus 40 of the present embodiment conveys feeder 20 from storage device 50 to first slot 12*a* or second slot 12*b* of component mounter 10, and performs a supply work of feeder 20. In addition, conveyance apparatus 40 performs the exchange operation of feeder 20 between first slot 12*a* and second slot 12*b* of component mounter 10. Further, conveyance apparatus 40 conveys feeder 20 that is no longer needed in the production of board product 900 from component mounter 10 to storage device 50, and performs the collecting work of feeder 20.

Figure 3:
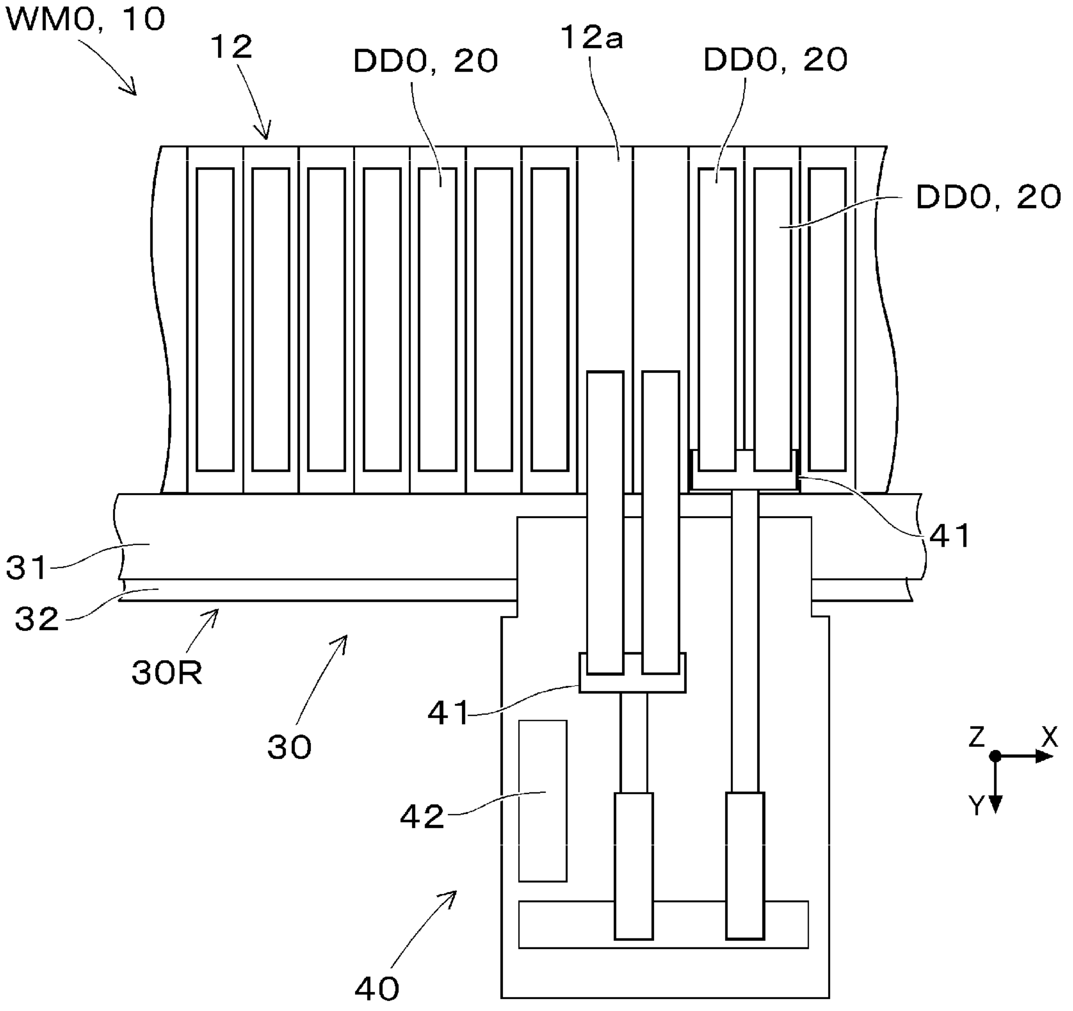
FIG. 3 is a plan view illustrating an example of exchange operation of a feeder between a conveyance apparatus and a component supply device of the component mounter.

As illustrated in FIG. 3, conveyance apparatus 40 includes at least one holding section 41 (two in FIG. 3) and control device 42. In the present embodiment, each of two holding sections 41 can simultaneously clamp multiple (two in FIG. 3) feeders 20, and can simultaneously hold multiple (two) feeders 20. In addition, each of two holding sections 41 is independently movable along an attachment/detachment direction (Y direction in the present embodiment) of feeder 20 by, for example, the linear motion mechanism or the like, and can simultaneously move multiple (two) feeders 20 along the Y direction.

In addition, two holding sections 41 are integrally movable in the vertical direction (Z direction) by, for example, a linear motion mechanism or the like, so that multiple (four) feeders 20 can be simultaneously moved in the Z direction. Conveyance apparatus 40 may include, for example, multiple (four) holding sections 41. In this case, each of multiple (four) holding sections 41 clamps one feeder 20, so that multiple (four) feeders 20 can be moved independently in the Y direction and the Z direction. In addition, a form of holding section 41 is not limited to the clamp mechanism and the linear motion mechanism, and can have various forms. For example, holding section 41 may include a protruding portion that can be fitted into a hole portion provided in feeder 20. In this case, feeder 20 is held by fitting the protruding portion of holding section 41 into the hole portion of feeder 20.

Control device 42 includes well-known computing device and storage device, and a control circuit is configured. Control device 42 is communicably connected to multiple component mounters 10, exchange system 30, storage device 50, and line management device 60. Control device 42 controls the movement (traveling) of conveyance apparatus 40, the operation of two holding sections 41, and the like. According to the above configuration, conveyance apparatus 40 can move to a predetermined position along first rail 31 and second rail 32, and can perform the exchange operation of feeder 20 at the stop position.

Storage device 50 can store not only feeder 20 but also article DD0 used in the board work by board working machine WM0. For example, in a case where board working machine WM0 is component mounter 10, a reel or a tray for accommodating multiple components, a tray unit for accommodating the tray, mounting head 13*b*, a holding member (suction nozzle, chuck or the like), and a nozzle station are included in article DD0. In a case where board working machine WM0 is a solder printer that prints solder on board 90, a solder container, a mask, a squeegee, and a dispense head are included in article DD0. In a case where board working machine WM0 is an inspection machine, an inspection head is included in article DD0. The inspection machine includes a solder inspection machine that inspects solder printed on board 90, and an appearance inspector that inspects the components mounted on board 90.

In addition, conveyance apparatus 40 can supply article DD0 to board working machine WM0. Specifically, conveyance apparatus 40 can supply article DD0 stored in storage device 50 to board working machine WM0. In addition, conveyance apparatus 40 can collect article DD0 that has become unnecessary in the production of board product 900 in storage device 50. Further, board working machine WM0 may include not only component mounter 10 but also first slot 12*a* and second slot 12*b*, and first slot 12*a* and second slot 12*b* may hold article DD0.

1-4. Configuration Example of Conveyance Apparatus Information Teaching System 70

Conveyance apparatus 40 moves in board production line WL0, and stops when an operator approaches the conveyance apparatus. As the number of stops of conveyance apparatus 40 increases, the production efficiency of board product 900 in board production line WL0 may decrease. Therefore, there is a demand for providing information related to the movement of conveyance apparatus 40 to the operator to reduce the stops of conveyance apparatus 40 due to the approach of the operator.

Board production line WL0 of the present embodiment is provided with conveyance apparatus information teaching system 70. Conveyance apparatus information teaching system 70 includes acquisition section 71 and display section 72, and displays virtual information including conveyance apparatus information. Acquisition section 71 and display section 72 may be provided in various computing devices and control devices. For example, acquisition section 71 and display section 72 may be provided in line management device 60, a management device that manages multiple board production lines WL0, or the like. In addition, acquisition section 71 and display section 72 may be formed on a cloud.

Figure 4:
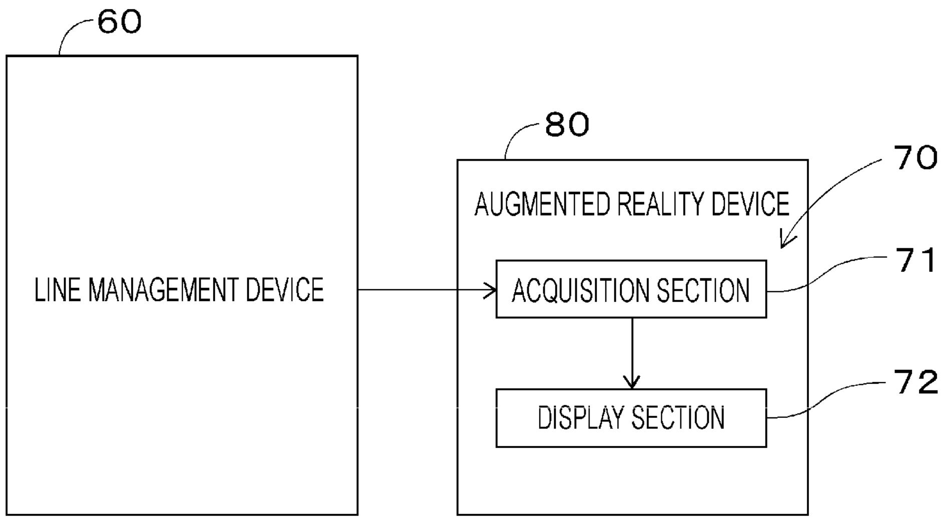
FIG. 4 is a block diagram illustrating an example of a control block of a conveyance apparatus information teaching system.
Figure 5:
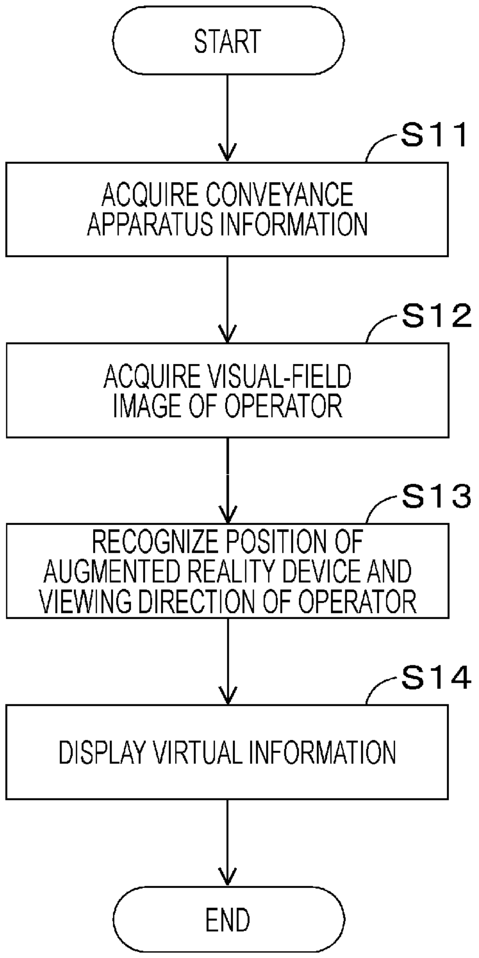
FIG. 5 is a flowchart illustrating an example of a control procedure by the conveyance apparatus information teaching system.

As illustrated in FIG. 4, in the present embodiment, acquisition section 71 and display section 72 are provided in the control device of augmented reality device 80. In addition, conveyance apparatus information teaching system 70 executes control according to, for example, the flowchart shown in FIG. 5. Acquisition section 71 performs processing illustrated in step S11. Display section 72 executes processing illustrated in steps S12, S13, and S14.

1-4-1. Acquisition Section 71

Acquisition section 71 acquires conveyance apparatus information including information related to the movement of conveyance apparatus 40 that conveys article DD0 used in the board work to board production line WL0 including board working machine WM0 (step S11). In the present embodiment, board working machine WM0 is component mounter 10, and article DD0 is feeder 20. However, board working machine WM0 and article DD0 are not limited thereto, and may be board working machine WM0 and article DD0 described above.

In addition, in the present embodiment, conveyance apparatus 40 is provided to be movable on track 30R extending along the conveyance direction (X direction) of board 90. As described above, conveyance apparatus 40 moves in accordance with the production of board product 900. Therefore, the information related to the movement of conveyance apparatus 40 can be managed by, for example, line management device 60, a management device that manages multiple board production lines WL0, and the like. In the present embodiment, the information related to the movement of conveyance apparatus 40 is managed by line management device 60.

The conveyance apparatus information includes various pieces of information related to the movement of conveyance apparatus 40. For example, conveyance apparatus 40 is provided with a human sensor that detects the approach of the operator, an objective sensor that detects an object being gripped, and the like. For example, when the operator enters the detection range of the human sensor, the human sensor detects the approach of the operator, and conveyance apparatus 40 stops. The detection range of the human sensor moves with the movement of conveyance apparatus 40, and is included in movable range AR0 in which conveyance apparatus 40 may move. In the present embodiment, since conveyance apparatus 40 moves on track 30R, movable range AR0 is a region extending along track 30R.

In the present embodiment, the conveyance apparatus information includes information indicating movable range AR0 in which conveyance apparatus 40 may move. In addition, movable range AR0 includes retreat region AR1 that is a region in which the operator is to be separated from conveyance apparatus 40 during the movement of conveyance apparatus 40. Retreat region AR1 includes the detection range of the human sensor, and the entry of the operator is prohibited in a predetermined time slot. Further, the conveyance apparatus information may include information indicating the moving direction of conveyance apparatus 40.

In addition, the conveyance apparatus information may include information related to conveyance apparatus 40 other than the information related to the movement of conveyance apparatus 40. For example, in a case where multiple conveyance apparatuses 40 are used, identification information for identifying multiple conveyance apparatuses 40 is included in the conveyance apparatus information. The conveyance apparatus information may be acquired in advance from a production plan, a production program, and the like. For example, acquisition section 71 may acquire the conveyance apparatus information managed by line management device 60 by using known wireless communication such as a wireless local area network (LAN).

1-4-2. Display Section 72

When the operator visually recognizes target region TAO via augmented reality device 80, display section 72 displays the virtual information including the conveyance apparatus information acquired by acquisition section 71 in an overlapping manner on real target region TAO visually recognized by the operator via augmented reality device 80 (steps S12 to S14). Target region TAO is at least a part of board production line WL0, and is any region corresponding to the visual field of the operator.

Augmented reality device 80 is a device capable of displaying virtual information in accordance with the real world visually recognized by the operator. A technique for displaying virtual information in accordance with a real world visually recognized by an operator is called augmented reality, mixed reality, or the like, for example. Augmented reality device 80 only needs to be able to display virtual information in accordance with the real world visually recognized by the operator, and a known device adopted in the above technique can be used.

Figure 6:
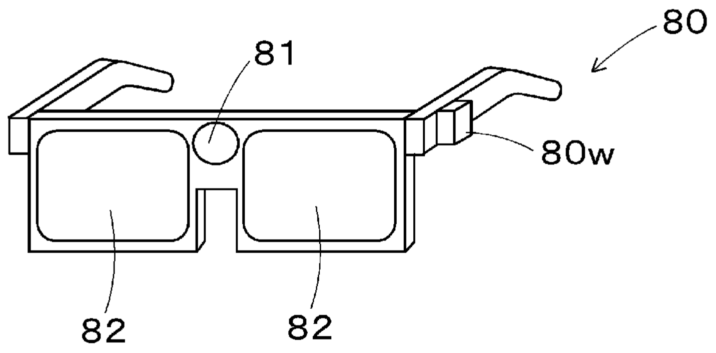
FIG. 6 is a perspective view illustrating a configuration example of an augmented reality device.

FIG. 6 illustrates a configuration example of augmented reality device 80. As illustrated in FIG. 6, augmented reality device 80 of the present embodiment is formed in the shape of glasses. The operator can use augmented reality device 80 by wearing augmented reality device 80 (hereinafter, referred to as being equipped with augmented reality device 80) similarly to glasses. Augmented reality device 80 includes at least one imaging section 81 (in FIG. 6, one imaging section 81), at least one visual recognition section 82 (in FIG. 6, two visual recognition sections 82 and 82), and wireless communication section 80*w*.

Figure 7:
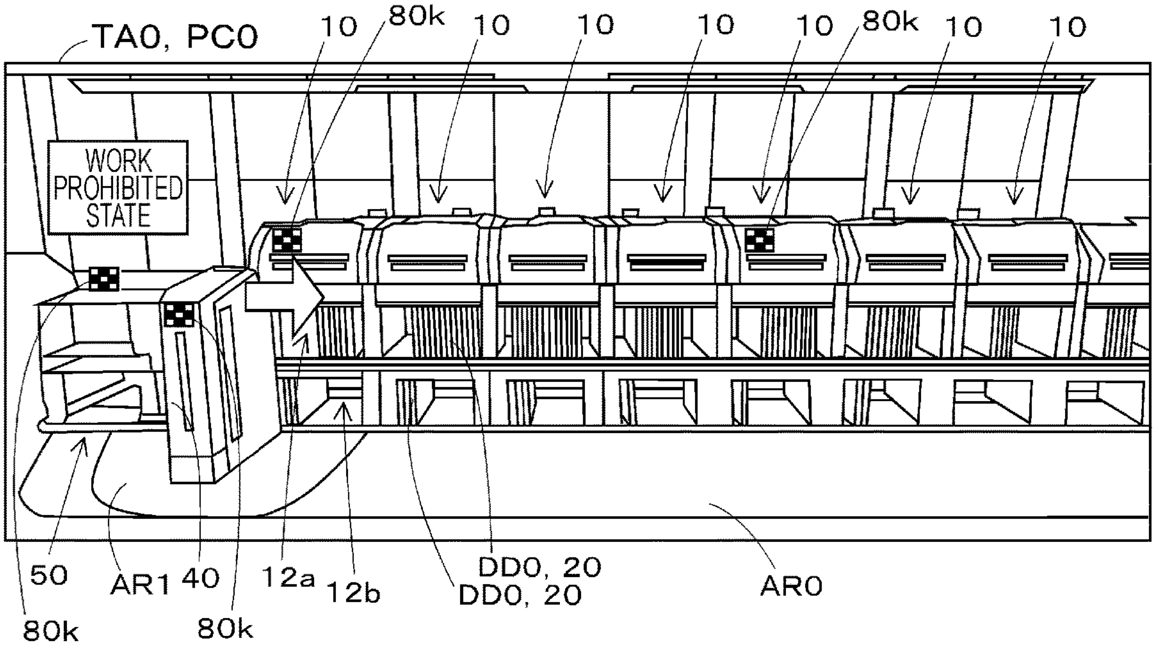
FIG. 7 is a schematic diagram illustrating an example of display by a display section when an operator visually recognizes a target region via the augmented reality device.

A known imaging device can be used as imaging section 81. Imaging section 81 of the present embodiment is provided between two visual recognition sections 82 and 82, and imaging range is set in accordance with the visual field of the operator. When the operator visually recognizes target region TAO, imaging section 81 images target region TAO to acquire visual-field image PC0 of the operator (step S12). FIG. 7 illustrates an example of visual-field image PC0. In visual-field image PC0 illustrated in FIG. 7, seven component mounters 10, conveyance apparatus 40, and storage device 50 are captured.

As illustrated in FIG. 7, identification marker 80*k* is provided in predetermined component mounter 10. Identification marker 80*k* of the present embodiment is provided with a checkered pattern in which white squares and black squares are alternately arranged. Identification marker 80*k* may be, for example, a one-dimensional code or a two-dimensional code. In addition, identification marker 80*k* may also be provided in conveyance apparatus 40, storage device 50, or the like. In this way, identification marker 80*k* may be provided at a portion that can be visually recognized by the operator. In addition, imaging section 81 may also simultaneously image multiple identification markers 80*k* described above. This improves the accuracy in recognizing the position of augmented reality device 80 and the viewing direction of the operator, which will be described later.

As illustrated in FIG. 6, two visual recognition sections 82 and 82 are provided at positions corresponding to both eyes of the operator when the operator is equipped with augmented reality device 80. The operator can visually recognize the real world via two visual recognition sections 82 and 82 in a state of being equipped with augmented reality device 80. In addition, the operator can visually recognize the virtual information displayed on two visual recognition sections 82 and 82 via two visual recognition sections 82 and 82 in a state of being equipped with augmented reality device 80.

Wireless communication section 80*w* can communicate with a control device such as line management device 60 by using known wireless communication such as a wireless LAN. As described above, acquisition section 71 and display section 72 are provided in the control device of augmented reality device 80. Acquisition section 71 can acquire the conveyance apparatus information managed by line management device 60 by using wireless communication section 80*w*. Wireless communication section 80*w* can also transmit the image data of visual-field image PC0 captured by imaging section 81 to a control device such as line management device 60. In this way, wireless communication section 80*w* can transmit and receive various pieces of information between a control device such as line management device 60 and augmented reality device 80.

Display section 72 recognizes the position of augmented reality device 80 and the viewing direction of the operator (step S13). For example, as the distance between identification marker 80*k* and augmented reality device 80 decreases, the size of identification marker 80*k* included in visual-field image PC0 increases. Conversely, as the distance between identification marker 80*k* and augmented reality device 80 increases, the size of identification marker 80*k* included in visual-field image PC0 decreases. In addition, even if the distance between identification marker 80*k* and augmented reality device 80 is the same, the shape and size of identification marker 80*k* included in visual-field image PC0 vary depending on the viewing direction of the operator.

Display section 72 can recognize the position of augmented reality device 80 and the viewing direction of the operator based on the appearance (for example, arrangement, size, shape, and the like) of identification marker 80*k* included in visual-field image PC0. Specifically, display section 72 can recognize the position of augmented reality device 80 and the viewing direction of the operator by comparing the appearance of identification marker 80*k* included in visual-field image PC0 with the appearance information of identification marker 80*k* acquired in advance.

For example, a template for each position of augmented reality device 80 and each viewing direction of the operator is included in the appearance information. Display section 72 searches for a template matching the appearance of identification marker 80*k* included in visual-field image PC0, and recognizes the position of augmented reality device 80 corresponding to the template and the viewing direction of the operator. Identification markers 80*k* of the present embodiment are provided with a checkered pattern in which white squares and black squares are alternately arranged. In white and black, the difference in luminance is the largest, and the outline, the intersection, and the like are easily extracted. Therefore, display section 72 can easily recognize the position of augmented reality device 80 and the viewing direction of the operator.

Display section 72 displays the virtual information including the conveyance apparatus information acquired by acquisition section 71 in an overlapping manner on real target region TAO visually recognized by the operator via augmented reality device 80 (step S14). Display section 72 can display various pieces of virtual information in accordance with the position of augmented reality device 80 and the viewing direction of the operator. As described above, the conveyance apparatus information includes information indicating movable range AR0 in which conveyance apparatus 40 may move. In this case, as illustrated in FIG. 7, display section 72 can display the virtual information indicating movable range AR0 in an overlapping manner on real target region TAO visually recognized by the operator via augmented reality device 80.

In the present embodiment, conveyance apparatus 40 is provided to be movable on track 30R extending along the conveyance direction (X direction) of board 90. Therefore, movable range AR0 is a region extending along track 30R. Display section 72 enlarges or reduces virtual information (image) of movable range AR0 acquired in advance as necessary in accordance with the position of augmented reality device 80 and the viewing direction of the operator, and rotates or tilts the virtual information as necessary for display. The display of the virtual information (image) described above can be similarly applied to other virtual information.

In addition, movable range AR0 includes retreat region AR1 that is a region in which the operator is to be separated from conveyance apparatus 40 during the movement of conveyance apparatus 40. As illustrated in FIG. 7, display section 72 can display virtual information indicating retreat region AR1 in an overlapping manner on real target region TAO visually recognized by the operator via augmented reality device 80. Further, the conveyance apparatus information includes information indicating the moving direction of conveyance apparatus 40. As illustrated in FIG. 7, display section 72 can display virtual information (in FIG. 7, an arrow directed to the right of the paper surface) indicating the moving direction of conveyance apparatus 40 in an overlapping manner on real target region TAO visually recognized by the operator via augmented reality device 80.

Figure 8:
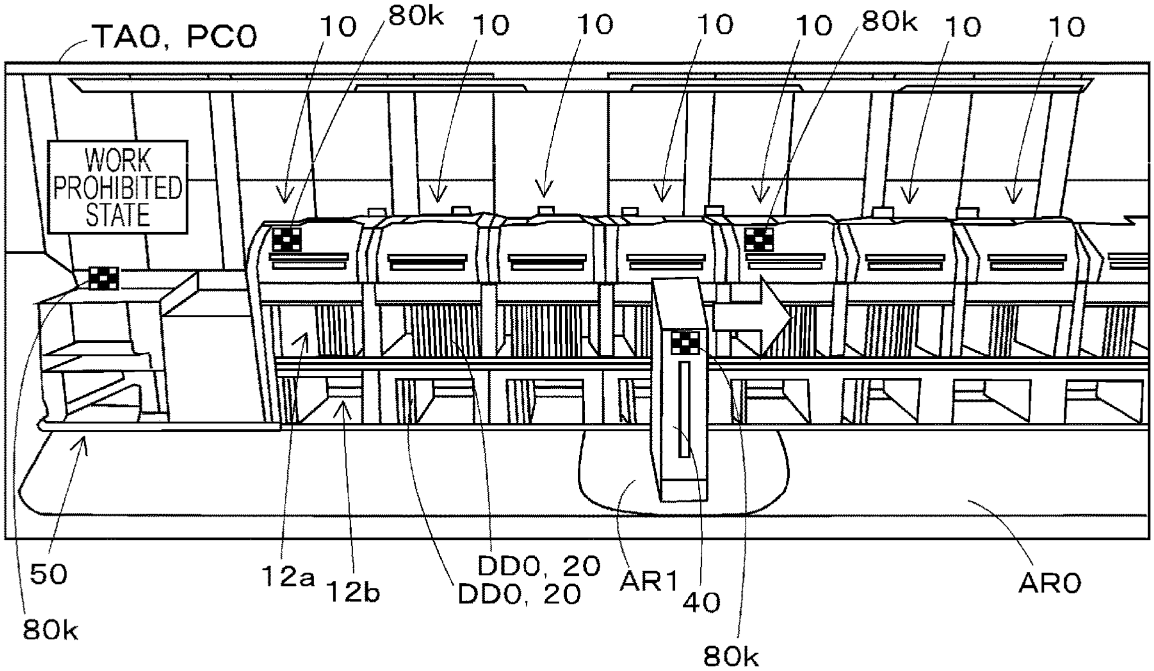
FIG. 8 is a schematic diagram illustrating another example of display by the display section when the operator visually recognizes a target region via the augmented reality device.

Display section 72 can also change the virtual information displayed on augmented reality device 80 in accordance with the progress state of the production of board product 900. Accordingly, the operator can know the virtual information matching the progress state of the production of board product 900. For example, display section 72 can move the information indicating retreat region AR1, which is a region in which the operator is to be separated from conveyance apparatus 40 during the movement of conveyance apparatus 40, in accordance with the progress state of the production of board product 900. For example, as illustrated in FIG. 8, in a state where the production of board product 900 has progressed from the state illustrated in FIG. 7, display section 72 can move and display the information indicating retreat region AR1 illustrated in FIG. 7 in accordance with the movement of conveyance apparatus 40.

In addition, display section 72 can also display the virtual information including the future conveyance apparatus information in which production of board product 900 has progressed in an overlapping manner on real target region TAO which is currently visually recognized by the operator via augmented reality device 80. For example, display section 72 can move a virtual object schematically indicating conveyance apparatus 40 to real target region TAO which is currently visually recognized by the operator via augmented reality device 80 by animation. Accordingly, the operator can know the future movement state of conveyance apparatus 40 in advance. Display section 72 can also display the time at which conveyance apparatus 40 approaches the operator.

The operator can carry feeder 20 necessary for production of board product 900 into storage device 50. In addition, the operator can carry out feeder 20 that is no longer needed in the production of board product 900 from storage device 50. At this time, the operator enters movable range AR0 in which conveyance apparatus 40 may move. The virtual information may include work availability information which is information indicating a permitted state in which the work by the operator is permitted or a prohibited state in which the work by the operator is prohibited. In this case, display section 72 can display the work availability information in accordance with the progress state of production of board product 900.

For example, in the state illustrated in FIG. 7, conveyance apparatus 40 approaches storage device 50, and retreat region AR1 is included in the work area of storage device 50 in which the operator works. At this time, the work availability information includes information indicating a prohibited state. Accordingly, as illustrated in FIG. 7, display section 72 displays a work prohibited state (prohibition of work). Conversely, in the state illustrated in FIG. 8, conveyance apparatus 40 is separated from storage device 50, and retreat region AR1 is not included in the work area of storage device 50 in which the operator works. At this time, the work availability information includes information indicating a permitted state. Accordingly, as illustrated in FIG. 8, display section 72 displays a work permitted state (permission of work). Thus, the operator can know the permitted state or the prohibited state of the work.

The virtual information may include operator related information which is information related to at least one of the work performed by the operator, a method of operating board working machine WM0 performed by the operator, and a method of the operator dealing with a malfunction occurring in board working machine WM0. For example, a carrying-in work of carrying feeder 20 into storage device 50 and a carrying-out work of carrying feeder 20 out of storage device 50 are included in the work performed by the operator. The exchange operation of mounting head 13*b* of component mounter 10 is included in the work performed by the operator. In addition, a method of giving a predetermined instruction to board working machine WM0 is included in a method of the operator operating board working machine WM0. Further, the method of exchanging mounting head 13*b* in which a malfunction has occurred is included in the method of the operator dealing with a malfunction occurring in board working machine WM0.

Display section 72 displays the operator related information. For example, display section 72 displays virtual information (for example, a slot number, an arrow indicating a slot position, and the like) indicating a slot position at which feeder 20 is installed in real storage device 50 visually recognized by the operator via augmented reality device 80. When the operator installs multiple feeders 20, display section 72 can also display virtual information indicating a slot position at which next feeder 20 is installed every time one feeder 20 is installed in a predetermined slot.

Display section 72 can also display virtual information (for example, a slot number, an arrow indicating a slot position, and the like) indicating a slot position at which feeder 20 to be collected is installed in real storage device 50 which is visually recognized by the operator via augmented reality device 80. In a case where the operator collects multiple feeders 20, display section 72 can also hide the virtual information related to collected feeder 20 every time one feeder 20 is collected from a predetermined slot. In addition, display section 72 can also display the exchange procedure of mounting head 13*b* in the vicinity of real mounting head 13*b* visually recognized by the operator via augmented reality device 80 when the operator performs the exchange operation of mounting head 13*b*. Accordingly, the operator can easily perform a work. In addition, the operator can easily deal with a malfunction.

When the operator gives a predetermined instruction to board working machine WM0, display section 72 can also display the operation method of an operation panel in the vicinity of the actual operation panel visually recognized by the operator via augmented reality device 80. Accordingly, the operator can easily perform the operation of board working machine WM0. When a new device is installed in board production line WL0, it may take time for the operator to learn the method of operating board working machine WM0.

Therefore, when a new device is installed in board production line WL0, display section 72 may display the method of operating the device in the vicinity of the actual device visually recognized by the operator via augmented reality device 80. In addition, when a new device is installed in board production line WL0, display section 72 can also display the method of operating the changed portion changed from the existing device in the vicinity of the actual device visually recognized by the operator via augmented reality device 80.

1-5. Modification Embodiment

In the embodiment described above, conveyance apparatus 40 is provided to be movable on track 30R extending along the conveyance direction (X direction) of board 90. However, conveyance apparatus 40 may be an automated guided vehicle. When conveyance apparatus 40 is an automated guided vehicle, track 30R is omitted. Also in this case, conveyance apparatus 40 can perform the supply work of article DD0 by conveying article DD0 from storage device 50 to first slot 12*a* or second slot 12*b* of board working machine WM0.

In addition, conveyance apparatus 40 can perform the exchange operation of article DD0 between first slot 12*a* and second slot 12*b* of board working machine WM0. Further, conveyance apparatus 40 can convey article DD0 that is no longer needed in the production of board product 900 from board working machine WM0 to storage device 50, and perform the collecting work of article DD0. In addition, conveyance apparatus 40 can also perform the supply work of article DD0 on board working machine WM0 directly without storage device 50, and perform the collecting work of article DD0.

In this way, when conveyance apparatus 40 is an automated guided vehicle, conveyance apparatus 40 can move (travel) along any travel route. Therefore, the conveyance apparatus information may include route information that is information related to a route along which conveyance apparatus 40 is scheduled to travel. In this case, display section 72 displays the route information. For example, display section 72 can display the route information (for example, an arrow indicating a route scheduled to be traveled) in real target region TAO visually recognized by the operator via augmented reality device 80. Accordingly, the operator can easily know the route along which conveyance apparatus 40 is scheduled to travel.

Display section 72 can display various pieces of virtual information as in the above-described embodiment. In addition, display section 72 can also change the route information displayed on augmented reality device 80 in accordance with the progress state of the production of board product 900. Further, display section 72 can also display a time at which conveyance apparatus 40 approaches the operator.

2. Conveyance Apparatus Information Teaching Method

The above description of conveyance apparatus information teaching system 70 can be similarly applied to a conveyance apparatus information teaching method. Specifically, a conveyance apparatus information teaching method includes an acquisition step and a display step. The acquisition step corresponds to the control performed by acquisition section 71. The display step corresponds to control performed by display section 72.

3. Example of Effects of Embodiment and Modification Embodiment

Conveyance apparatus information teaching system 70 includes acquisition section 71 and display section 72. Accordingly, conveyance apparatus information teaching system 70 can guide the operator with information (conveyance apparatus information) related to the movement of conveyance apparatus 40. The above description of conveyance apparatus information teaching system 70 can be similarly applied to a conveyance apparatus information teaching method.

REFERENCE SIGNS LIST

30R: track, 40: conveyance apparatus, 70: conveyance apparatus information teaching system, 71: acquisition section, 72: display section, 80: augmented reality device, 90: board, 900: board product, DD0: article, TAO: target region, AR0: movable range, AR1: retreat region, WL0: board production line, WM0: board working machine

The invention claimed is:

1. A conveyance apparatus information teaching system comprising:

acquisition circuitry configured to acquire conveyance apparatus information including information related to movement of a conveyance apparatus configured to convey an article used in a predetermined board work to a board production line including a board working machine configured to produce a board product by performing the board work on a board; and display circuitry configured to, when an operator visually recognizes a target region which is at least a part region of the board production line via an augmented reality device capable of displaying virtual information in accordance with a real world visually recognized by the operator, display the virtual information including the conveyance apparatus information acquired by the acquisition circuitry in an overlapping manner on a real target region visually recognized by the operator via the augmented reality device.

2. The conveyance apparatus information teaching system according to claim 1, wherein the conveyance apparatus information includes information indicating a movable range in which the conveyance apparatus may move.

3. The conveyance apparatus information teaching system according to claim 2, wherein the movable range includes a retreat region that is a region in which the operator is to be separated from the conveyance apparatus during movement of the conveyance apparatus.

4. The conveyance apparatus information teaching system according to claim 1, wherein the conveyance apparatus information includes information indicating a moving direction of the conveyance apparatus.

5. The conveyance apparatus information teaching system according to claim 1, wherein the display circuitry is further configured to change the virtual information displayed on the augmented reality device in accordance with a progress state of production of the board product.

6. The conveyance apparatus information teaching system according to claim 5, wherein the display circuitry is further configured to move information indicating a retreat region that is a region in which the operator is to be separated from the conveyance apparatus during movement of the conveyance apparatus in accordance with the progress state of the production of the board product.

7. The conveyance apparatus information teaching system according to claim 5, wherein the virtual information includes work availability information that is information indicating a permitted state in which a work by the operator is permitted or a prohibited state in which the work by the operator is prohibited, and the display circuitry is further configured to display the work availability information in accordance with the progress state of the production of the board product.

8. The conveyance apparatus information teaching system according to claim 1, wherein the virtual information includes operator related information that is information related to at least one of a work performed by the operator, a method of operating the board working machine performed by the operator, and a method of the operator dealing with a malfunction occurring in the board working machine, and the display circuitry is further configured to display the operator related information.

9. The conveyance apparatus information teaching system according to claim 1, wherein the conveyance apparatus is provided to be movable on a track extending along a conveyance direction of the board.

10. The conveyance apparatus information teaching system according to claim 1, wherein the conveyance apparatus is an automated guided vehicle.

11. The conveyance apparatus information teaching system according to claim 10, wherein the conveyance apparatus information includes route information that is information related to a route along which the conveyance apparatus is scheduled to travel, and the display circuitry is further configured to display the route information.

12. A conveyance apparatus information teaching method comprising:

acquiring conveyance apparatus information including information related to movement of a conveyance apparatus configured to convey an article used in a predetermined board work to a board production line including a board working machine configured to produce a board product by performing the board work on a board; and displaying the virtual information including the conveyance apparatus information in an overlapping manner on a real target region visually recognized by an operator via the augmented reality device when the operator visually recognizes a target region which is at least a part region of the board production line via an augmented reality device capable of displaying virtual information in accordance with a real world visually recognized by the operator.

* * * * *